United States Patent [19]

Brems

[11] 4,201,284
[45] May 6, 1980

[54] PALLET REGISTRY SYSTEM

[76] Inventor: John H. Brems, 32867 White Oaks Trail, Birmingham, Mich. 48010

[21] Appl. No.: 957,300

[22] Filed: Nov. 2, 1978

[51] Int. Cl.$^2$ ............................................. B65G 47/00
[52] U.S. Cl. ..................................... 198/345; 198/472
[58] Field of Search ................. 198/345, 472; 29/1 R, 29/1 A

[56]  References Cited

U.S. PATENT DOCUMENTS

| | | | |
|---|---|---|---|
| 3,028,945 | 4/1962 | Harke et al. | 198/345 |
| 3,155,217 | 11/1964 | Cross | 198/345 |
| 3,888,341 | 6/1975 | Konkal et al. | 198/345 |
| 3,968,869 | 7/1976 | Stalker | 198/345 |
| 4,014,428 | 3/1977 | Ossbahr | 198/472 |
| 4,095,687 | 6/1978 | Shoiket | 198/345 |
| 4,148,400 | 4/1979 | Cross | 198/345 |

FOREIGN PATENT DOCUMENTS

| | | | |
|---|---|---|---|
| 979841 | 12/1975 | Canada | 198/472 |
| 2325222 | 11/1974 | Fed. Rep. of Germany | 198/345 |
| 1494639 | 9/1967 | France | 198/345 |

Primary Examiner—Joseph E. Valenza
Attorney, Agent, or Firm—Barnes, Kisselle, Raisch & Choate

[57]  ABSTRACT

A multiple station transfer machine in which workpieces are located and supported in pallets and transferred sequentially through said machine and precisely located in each station along the transfer line, a three point locating system in which each pallet is located in one direction at spaced pressure points by a force applied in the direction of and midway between said points. The force application is applied by complemental wedge surfaces which can shift the pallet to cause it to meet the spaced pressure points, after which the pallet is clamped. A sequential actuator first locates and then clamps the pallet into a registry position. Slide rails for lineal transfer of the pallets are arranged to shift vertically relative to other supports for the pallets at each station, so the rails may be shifted to a non-interfering position prior to a clamping sequence so variations in slide rail dimensions due to wear and other influences will not affect the vertical registry of the clamped pallets.

34 Claims, 30 Drawing Figures

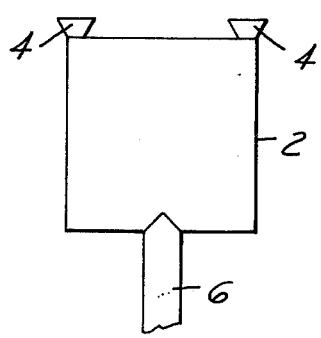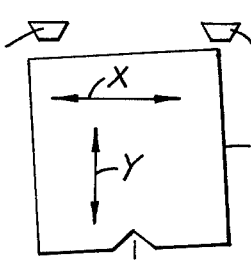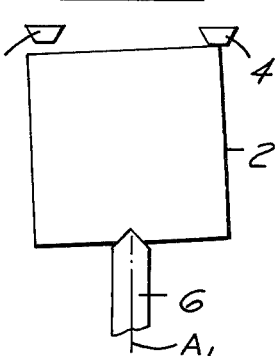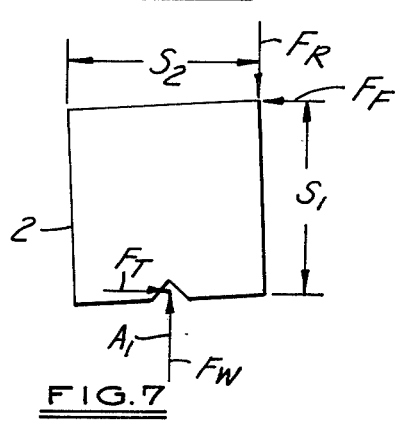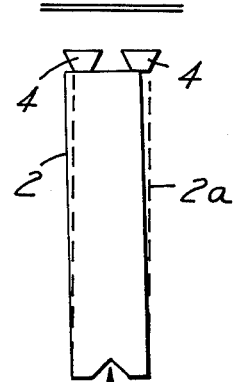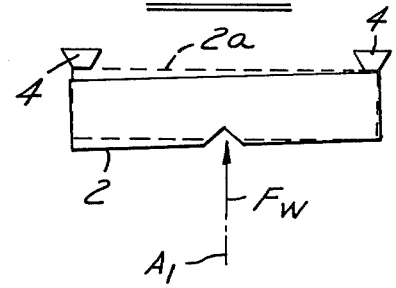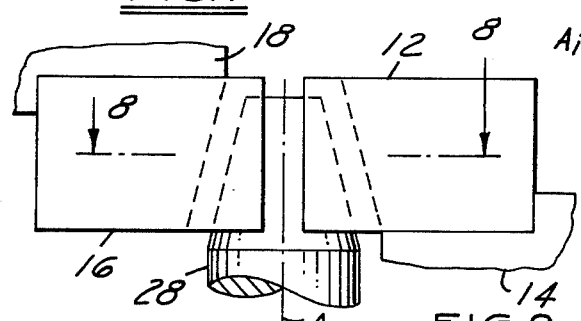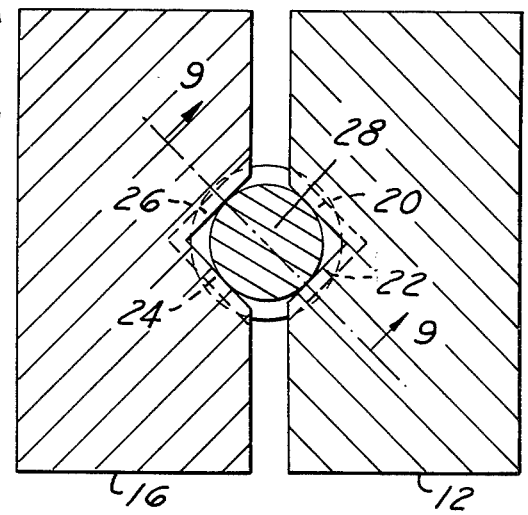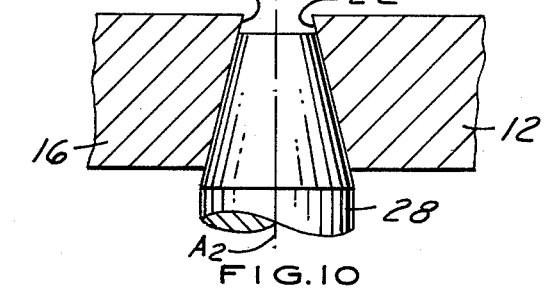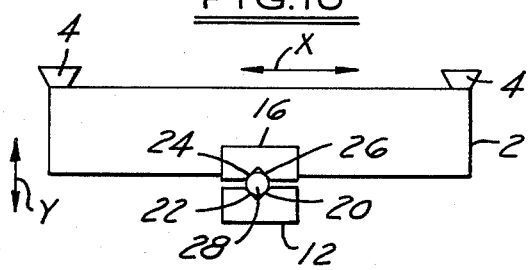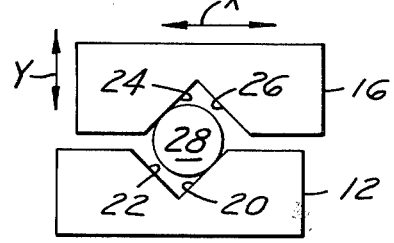

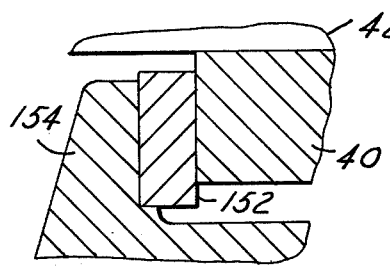
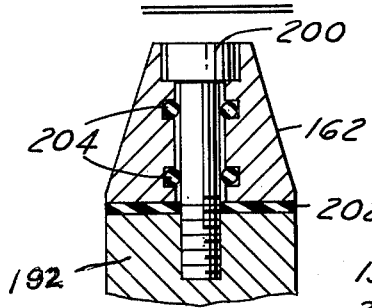
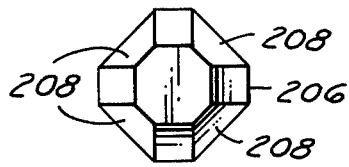
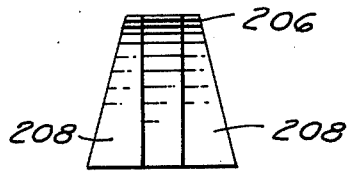
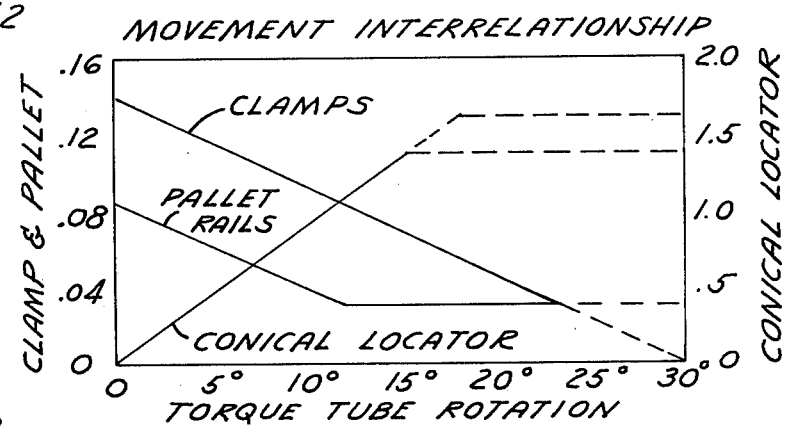
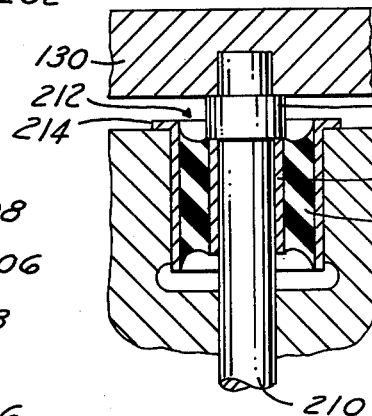
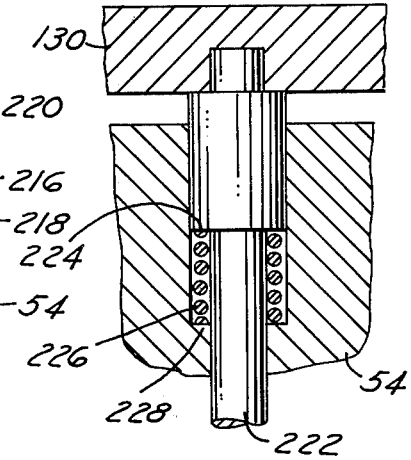
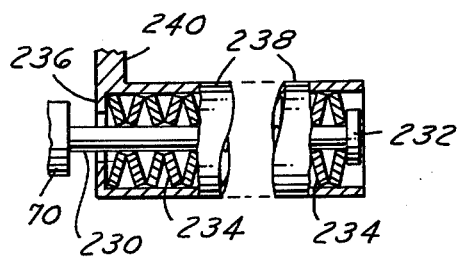
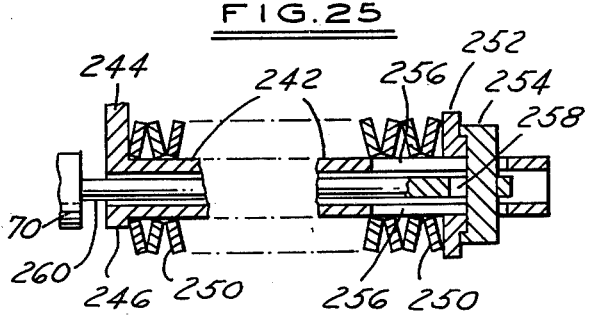

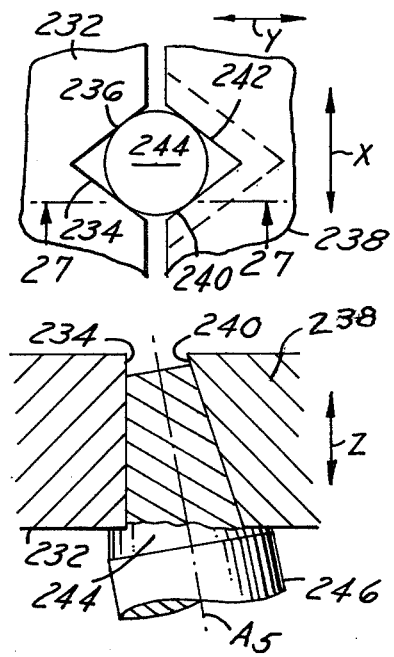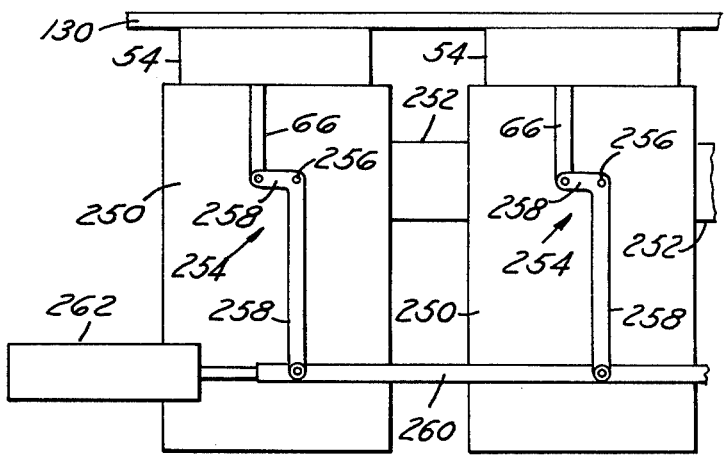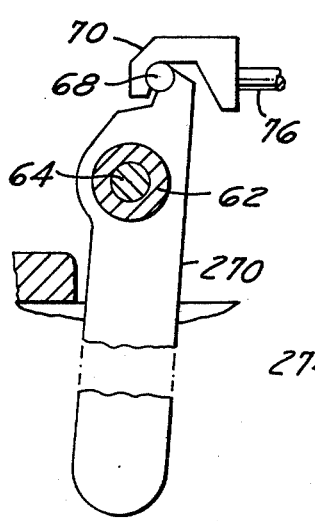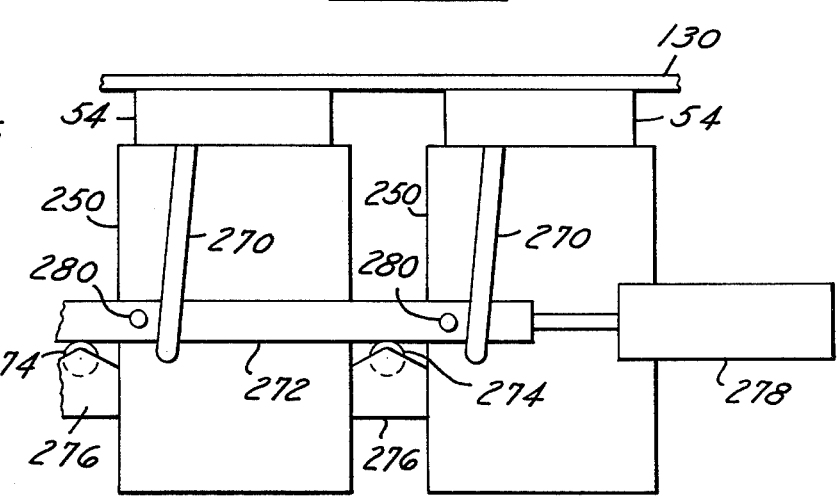

PALLET REGISTRY SYSTEM

FIELD OF INVENTION

Automation equipment utilizing work carrying pallets and locating devices for insuring accurate pallet location as each pallet comes to rest at a work station.

REFERENCE TO COPENDING APPLICATION

Reference is made to my copending applications, Ser. No. 950,318, filed Oct. 11, 1978, on a Pallet Registry System, and Ser. No. 918,528, filed June 23, 1978, on a Work Clamp and Pallet Combination.

BACKGROUND AND OBJECTS OF THE INVENTION

In some types of automatic workpiece processing, the workpieces are located and clamped in movable fixtures known as pallets, which are progressively transferred from station to station of a multiple station transfer machine. In each station of such a multiple station machine, these pallets are located as accurately as possible and clamped by a mechanism referred to as a pallet registry. Once located, a machine adjacent the pallet performs a milling or drilling or other operation on the workpiece. The accuracy of the resultant operation is only as accurate as the location of the pallet and workpiece.

A wide variety of types of registries have been in use in the industry for many years. Several such registry mechanisms are shown in U.S. Pat. Nos. 2,672,675; 2,673,386; 3,155,217; 3,571,872; 3,968,869 and my copending application, Ser. No. 950,318, filed Oct. 11, 1978. The location of a pallet with respect to a registry is generally accomplished with a pair of locating pins, vertically movable in the registry, which engage corresponding holes in each pallet. Slight errors of pallet location are inevitable because of the practical working clearances required between the locating pins and their guide sleeves in the registry frame, and between the locating pins and the corresponding holes in the pallet. These slight errors become progressively larger with usage due to pin, guide sleeve, and pallet hole wear.

It is one object of this invention to provide a pallet registry which is free of these initial working clearance type errors associated with locating pins, and, further to provide a pallet registry in which the location errors due to wear are significantly reduced.

It is often times convenient to rotate to pallet 90° about a vertical axis at some intermediate station as a pallet moves through the machine. This is generally done to bring otherwise inaccessible workpiece surfaces into position for processing by working stations which are disposed along either side of the line of pallet travel.

It is another object of this invention to provide a pallet registry and pallet combination which is capable of precisely locating a pallet with respect to the registry in any one of four attitudes of the pallet which are created by rotation of the pallet in 90° increments about a vertical centerline.

The movement of pallets through a transfer machine is presently accomplished in one of two ways; they can be slid from station to station on fixed rails driven by a horizontally reciprocating transfer bar which selectively engages all pallets to move them in the forward direction, and is disengaged from the pallets during its return travel; or the pallets ca be moved by a "lift and carry" mechanism from station to station by first being lifted by a set of transfer bars in a substantially vertical direction, then being moved forward with the transfer bars through a horizontal stroke equal to the station spacing, and finally being lowered by the transfer bars in a substantially vertical direction. The first slide system of pallet transferring requires only a simple reciprocating transfer bar and slide rails but has the disadvantage of locating the pallets along the vertical axis from the rails on which the sliding occurs and through the pallet feet which slide on the rails. Both the rails and pallet feet are very subject to wear, especially where dirt, dust and grit can accumulate on the rails, and this combined wear directly affects the accuracy of vertical pallet location. The lift and carry pallet transfer system eliminates the vertical location error problem due to wear, but at the expense of incorporating a more complex lift and carry type transfer system for the pallets.

It is another object of this invention to provide a pallet registry which combines the simplicity of moving the pallets on slide rails using a reciprocating transfer bar, but vertically locating the pallet in the registry on surfaces not subject to sliding wear.

Other objects of this invention are to provide registries which may be grouped together to be operated by a single power source; to provide registries in which the clamps have a significantly greater movement range than those of present designs, to provide registries which do not utilize screws, wedges, or other low efficiency mechanisms in generating the clamping force, and to provide registries in which the bending loads due to clamping are primarily confined to members whose deflection does not affect the accuracy of pallet location, and in which the bending loads imposed on the locating and structural components of the registry are minimized to achieve lower deflections per unit of clamping force.

Other objects of this invention will be apparent in the following description and claims with the accompanying drawings in which there is disclosed the principles of operation of the invention and the best mode presently contemplated for the practice thereof.

BRIEF DESCRIPTION OF THE DRAWINGS

Drawings accompany the disclosure and the various views thereof may be briefly described as:

FIG. 1, a diagrammatic view of a pallet with two fixed locators and one moving locator.

FIG. 2, a second diagrammatic view showing a pallet illustrating potential errors in location.

FIG. 3, an intermediate position in the locating action.

FIG. 4, a free body diagram showing the forces acting on a pallet.

FIGS. 5 and 6, diagrammatic views showing the force applications in varying width dimensions.

FIG. 7, an end view of a locating system viewed along the line of pallet travel.

FIG. 8, a plan view of the locator system on line 8—8 of FIG. 7.

FIG. 9, a sectional view on line 9—9 of FIG. 8.

FIG. 10, a schematic plan view of a total locating system.

FIG. 11, a plan view of offset condition of pallet.

FIG. 17, a section on line 17—17 of FIG. 12.

FIG. 18, a section showing a resilient mounting for a tapered locator.

FIG. 19, a diagram showing illustrative movement interrelationships.

FIG. 20, a plan view of a tapered pyramidal locator.

FIG. 21, a side view of a tapered pyramidal locator.

FIG. 22, a sectional view of an elastomeric rail rod guide.

FIG. 23, a sectional view of a spring biased rail rod guide.

FIG. 24, a sectional view of an alternate spring cartridge mechanism.

FIG. 25, a sectional view of a second alternate spring cartridge mechanism.

FIG. 26, a plan view of a tapered locator operating on an inclined axis.

FIG. 27, a section on line 27—27 of FIG. 26.

FIG. 28, a schematic elevation drawing of an illustrative registry actuation linkage.

FIG. 29, a partial side section of an alternate actuating lever.

FIG. 30, a schematic elevation drawing of an alternate illustrative registry actuation linkage.

Figure 12:
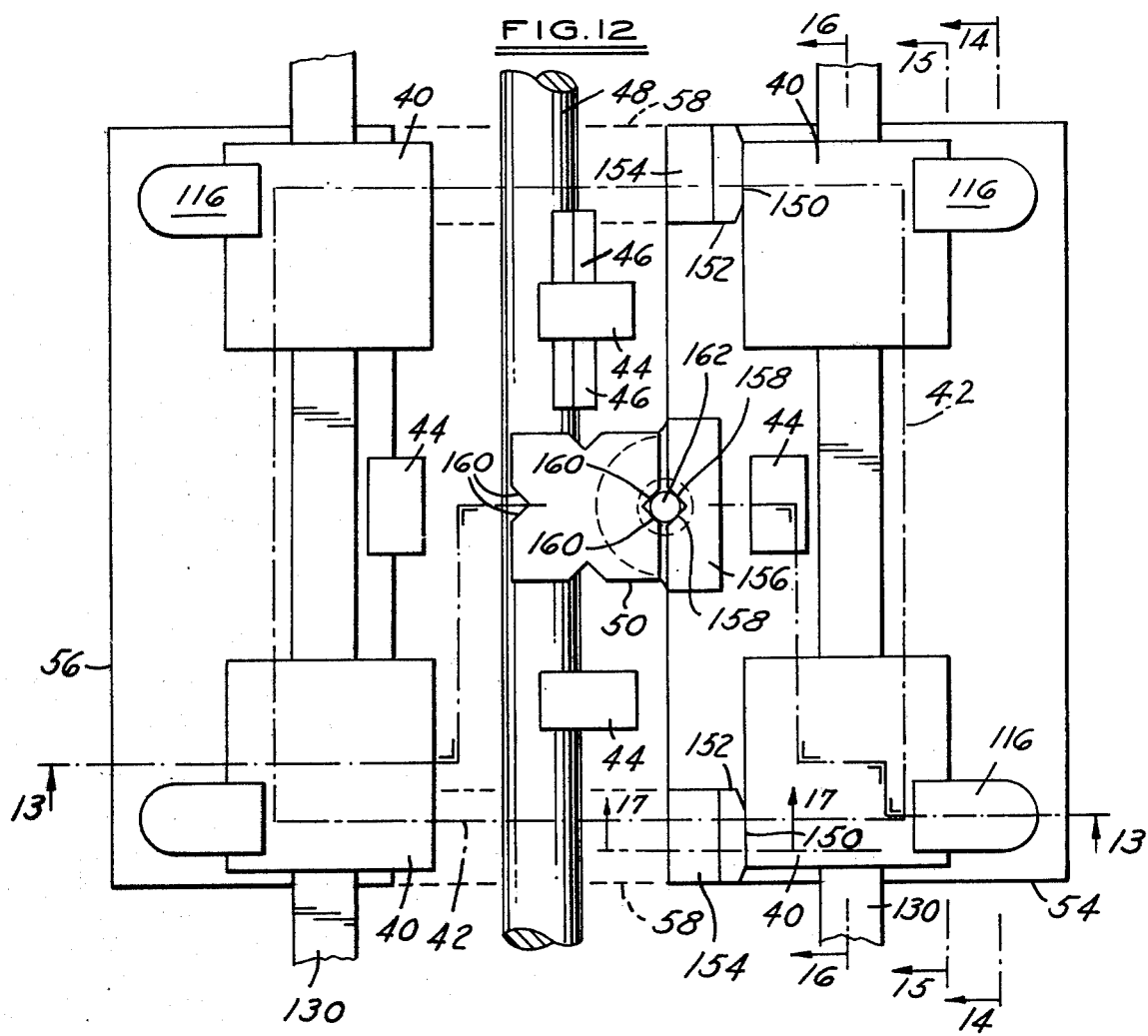
FIG. 12, a plan view of a pallet and registry mechanism.

In the aforesaid copending application in which is described a locating pin type pallet registry, the efficiency of a mechanism was defined as the ratio of the work (force times distance) output from the mechanism to the work input to the mechanism. High efficiency mechanisms, those having an efficiency of 85% or more, are pivots, levers, gears and rolling contact mechanisms; low efficiency mechanisms, those having an efficiency of less than 85% are screws and wedges. The loss of efficiency of a mechanism is due to the frictional losses therein. The efficiency of a mechanism was also shown to be the ratio of the output force with normal friction to the output force of that same mechanism with zero friction, for some fixed input force. These same considerations also apply to the invention disclosed herein.

In the accepted classical sense, every body has six degrees of freedom in space; three degrees of freedom in translation along the X, Y, and Z axes, and three degrees of freedom in rotation about the X, Y, and Z axes. In the location system described herein the locators which support the pallet vertically, which is along the Z axis, determine its position, in translation, along the Z axis; they also determine its angular position in rotation about the X axis and about the Y axis. These vertical support locators therefore lock these three degrees of freedom. The locking of the remaining three degrees of freedom, translation position along the X axis, translation position along the Y axis, and angular position about the Z axis (in the X-Y plane) will be described.

In the location of a pallet, or indeed any movable object with respect to a fixed system, certain fundamental considerations arise. The use of pins to locate a pallet, though commonly practiced, leads to small errors due to the required working clearances between the pin and its guide sleeve and between the pin and its mating hole in the pallet. A location system in which these inherent errors are eliminated is much to be preferred for high precision location. One such technique, using two fixed locators and one moving locator, is shown schematically in FIG. 1. A square pallet frame 2 is clamped against two fixed locating surfaces 4 by a wedge 6 or its functional equivalent guided by means to be subsequently shown which permit no lost motion.

The process of achieving the final location will now be analyzed. FIG. 2 shows this same pallet 2 which has been brought into the station by the transfer system while the locating wedge 6 is retracted. The errors of pallet location after it has been delivered by the transfer system are greatly exaggerated for clarity and to illustrate the location process. Even though the actual errors are significantly smaller, the locating behavior of the system remains the same. It will be noted that the total error between the pallet position relative to its final desired position is comprised of three components; an error in the X position of the pallet along the line of transfer; an error in the Y position of the pallet transverse to the line of transfer; and an error in the angular position of the pallet in the X-Y plane.

The wedge 6 is then moved inward along the Y axis by some external means until it is stopped by the pallet 2; i.e., its stroke is not to a fixed position, but to a fixed force. The wedge 6 movement is substantially continuous, but will be shown in discreet internals to illustrate the sequential events that occur during the overall locating process.

In FIG. 3, the wedge 6 has contacted the pallet 2 and pushed it over until it has contacted one of the locators 4, and the wedge has fully seated itself in the notch of the pallet 2. This step of the location process is straightforward and easily seen. From this position onward a very critical force and movement situation exists. Under what conditions does a continued inward movement of the wedge 6 cause the pallet to achieve the final located position shown in FIG. 1?.

A free body diagram of the pallet 2 illustrating all the forces on it is shown in FIG. 4. $F_W$ is the axial force on the wedge 6 and can be made arbitrarily large. $F_R$ is the reactive force on the pallet from the contacting locator 4. $F_F$ is the tangential force on the pallet 2 from the contacting locator 4 due to the friction at this interface; and $F_T$ is the induced force from the wedge 6 to the pallet 2 required to offset $F_F$.

Two other sets of forces are intentionally ignored in this analysis for simplicity. Because the accelerations are relatively small, forces required to create them are ignored, but their inclusion in the analysis would work against the locating forces. Furthermore, the frictional forces on the pallet due to its sliding on the surfaces which support its weight are also ignored, because to include them would require specific knowledge of the weight of the pallet relative to the magnitude of the locating force $F_W$; for the purposes of the analysis $F_W$ is assumed to be much larger than the support surface frictional forces, which are temporarily ignored.

Referring to FIG. 4 and with the aforesaid simplifications in mind, it can be seen that:

$$F_R = F_W \qquad (1)$$

$$F_F = F_T \qquad (2)$$

and if the coefficient of friction at the contacting locator 4 is given by $\mu$ then:

$$F_F = \mu F_R \qquad (3)$$

It can be seen that in order to move the pallet 2 to its final desired locating position, a clockwise moment $M_C$ must be applied to cause the required clockwise movement. Referring to FIG. 4, $S_1$ is the distance across the width of the locating portion of the pallet 2, and $S_2$ is the locating span between the fixed locators 4.

The clockwise moment $M_C$ is given by:

$$M_C = F_R S_2/2 - S_1 F_F$$

Substituting from equation (3)

$$M_C = F_R S_2/2 - S_1 \mu F_R$$

$$M_C = F_R(S_2/2 - S_1 \mu)$$

Since $F_R = F_W$ $$M_C = F_W(S_2/2 - S_1 \mu) \tag{4}$$

From equation 4, it can be seen that for $M_C$ to have a positive value $$S_2/2 > S_1 \mu$$

$$S_2/S_1 > 2\mu$$

Therefore, in order for a force $F_W$ to cause the pallet 2 to locate, the ratio $S_2/S_1$ must be at least double the coefficient of friction at the locator 4 to pallet 2 interface. Since the retarding friction of the support surfaces was omitted for simplicity of analysis, and since it also always detracts from the correcting couple, which, in this case, is shown as being clockwise, it follows that $S_2/S_1$ must be even greater than $2\mu$. Indeed, the larger the quantity $S_2/S_1$, the greater the correcting couple applied to the pallet 2 for any given value of wedge force $F_W$. The quantity $S_2/S_1$ will be termed the Locating Ratio, and, as shown by the previous analysis, the larger its value, the more easily is the pallet 2 moved from the position shown in FIG. 4 to its final located position shown in FIG. 1. This condition is further corroborated by reference to FIG. 5 and FIG. 6. In FIG. 5, the pallet 2 is configured to have a Locating Ratio of ¼ and it can be intuitively seen that the force $F_W$ cannot cause the pallet 2 to move to the desired located position 2a, shown dotted. On the other hand, in FIG. 6, the pallet 2 is configured to have a Locating Ratio of 4, and it can be seen that this situation makes it relatively easy for a force $F_W$ to move the pallet to the desired located position 2a.

For dependable locating, it is desirable to have the ratio $S_2/S_1$ greater than 2, when the temporarily ignored frictional resistance to movement caused by the weight of the pallet on the support surfaces is taken into account, and even larger values are more desirable. It can be seen in FIG. 6, or in FIG. 1, that when the pallet 2 is clamped against the fixed locators 4, its translational position along the Y axis and its angular position about the Z axis are both locked, and its translational position along the X axis is locked by the shape of the wedge 6 in its corresponding seat in pallet 2.

In the foregoing analysis, it was assumed that the pallet was mislocated in such a way that a clockwise correcting couple and clockwise movement was required to bring it to the desired final location. A similar analysis can be made to show that the same effects are noted if the initial location of the pallet 2 is such that a counterclockwise correcting movement is required to achieve the final located position. As will be seen in the invention to be described, the utilization of a very large Locating Ratio was a primary objective.

It was noted earlier that the motion of the wedge 6 must be through a system in which there is no lost motion between the wedge and its side guiding system. One very simple way this can be accomplished is by using a floating tapered double wedge or cone which operates between an accurately fixed reference locator mounted on the registry and a similar locator mounted on the pallet. Such a system is shown in FIGS. 7, 8 and 9.

FIG. 7 is an end view of a locating system, viewed along the line of pallet travel, which is the functional equivalent of the wedge system illustrated in FIGS. 1 to 6. A reference locator 12 is mounted to a registry frame 14 and a pallet locator 16 is mounted to the underside of a pallet 18. As can be seen from the sectional plan view, FIG. 8, locator 12 has cut into it two faces or planes 20 and 22; these faces 20 and 22 from a V when cut by any horizontal plane such as the sectioning plane of FIG. 8. Additionally, each of the faces 20 and 22 are inclined with respect to a vertical axis $A_2$.

Two faces or surfaces 24 and 26 are also cut into the pallet locator 16. These faces 24 and 26 also form a V when cut by any horizontal plane such as the sectioning plane of FIG. 8; and each of the faces 24 and 26 are also inclined with respect to the vertical axis $A_2$ at angles which are identical with the vertical inclination angles of faces 20 and 22 on the reference locator 12. When the pallet locator 16 is properly positioned with respect to the reference locator 12, the planes of the four faces 20, 22, 24 and 26 intersect at a common theoretical apex point. Stated another way, the four faces 20, 22, 24 and 26 comprises sectors of the faces of a four sided pyramid. This condition is created through the use of a floating conical locator 28 which is moved along a substantially vertical axis for the most part coincident with $A_2$, which is at right angles to the plane of movement of the pallet locator 16. Therefore, when the final positioning of pallet locator 16 is achieved, the conical locator 28 is in simultaneous line contact with each of the four faces 20, 22, 24 and 26.

The combination of the theoretical locating techniques illustrated in FIGS. 1–6 and in FIGS. 7–9 is shown in FIG. 10, a plan view schematic of the total locating system. It is assumed that the pallet 2 is suitably supported with feet resting on support surfaces which support it on the Z, or vertical axis, perpendicular to the X-Y plane. The position of the pallet 2 along the Y axis is determined by the fixed locators 4, and the position of the pallet 2 along the X axis is determined by having the conical locator 28 simultaneously in contact with the faces 24 and 26 on the pallet locator 16 and with the faces 20 and 22 on the fixed locator 20.

It is assumed that when the pallet 2 is brought into the station in which the pallet is to be located, a small and unequal clearance exists between the fixed locators 4 and the corresponding surface of the pallet 2; it is further assumed that the pallet is slightly mispositioned along the X axis. It will be noted that the Locating Ratio, as previously defined, is in excess of 4 to 1. The entire locating sequence is created by the upward vertical movement of the conical locator 28 which is driven by a suitable mechanism to be described. It is also assumed that the total mislocation of the pallet 2 with respect to the reference locator 12 is sufficiently small to permit the smallest diameter of the conical locator 28 to enter the interspace defined by the faces 20, 22, 24 and 26. During its upward travel, the conical locator 28 will generally first contact face 24 or 26 of the pallet locator 26. Since the conical locator 28 is resiliently mounted on its operating mechanism, it will be displaced until it contacts the face 20 or 22 of the fixed locator 12. Unless the pallet 2 has, by happenstance, been perfectly located in the "X" direction, the contact lines between the conical locator 28 will be diametrically opposite; i.e., the conical locator 28 will contact faces 20 and 24 or faces 22 and 26, depending on the position error of the pallet 2 in the X direction.

As the conical locator is moved upward in contact with either of two diametrically opposite face pairs, two locating processes occur. These two processes may occur simultaneously or sequentially, and, if sequentially, in one order or the other.

In one process, the upward moving conical locator 28 causes the pallet locator 16 to move away from the fixed locator 12 along the Y axis. This causes the pallet 2 to move away from the locator 12 until the pallet 2 contacts and is located by the two fixed locators 4, insofar as its Y axis position is established. This process may occur in two discreet steps: a first step in which the pallet 2 moves in translation until it contacts one or the other of the two locators 4 and a second step in which it moves in rotation until it contacts the other locator 4. In any case, one process caused by the upward movement of conical locator 28 is the location of the pallet 2 by both fixed locators 4.

The second process caused by the upward moving conical locator 28 is the proper positioning of the pallet 2 along the X axis. If, at the end of the first location process, the pallet is properly positioned along the X axis, the conical locator 28 will contact all four faces 20, 22, 24 and 26 simultaneously and any further upward movement is prevented. If, at the end of the first location process, the pallet 2 is not properly located along the X axis, one of two conditions exists; the pallet 2 is too far to the right or too far to the left as viewed in FIG. 10. If it is assumed that the pallet 2 is too far to the right, the condition between the fixed locator 12 and the pallet locator 16 will be as shown in FIG. 11. With the condition so drawn, it can be seen that the upward movement of the conical locator 28, forces a separation of face 24 on the pallet locator 16 from face 20 on the fixed locator 12. This forces the locator 16 to move to the left with respect to the fixed locator 12, moving the pallet 2 to the left also. Such movement of the locator 16 and pallet 2 to the left continues as a result of the upward movement of the conical locator 28, until the conical locator 28 also makes contact with the faces 22 and 26, at which point further upward movement of the conical locator 28 is prevented.

If it is assumed that the pallet 2 was originally mislocated to the left along the X axis, the conical locator 28 makes initial contact with faces 22 and 26 driving the pallet locator 16 to the right until it also makes contact with faces 20 and 24, at which point further upward movement of the conical locator 28 is again prevented.

It can be seen that in this second correction process, there is a tendency for the conical locator 28 to roll between the two surfaces with which it is in contact, which is desirable, since it tends to distribute the wear around the conical peripheral surface in a random manner.

In summary, the upward movement of the conical locator 28 causes the pallet 2 to be forced against the fixed locators 4 by a translation along the Y axis and by a rotation about the Z axis normal to the X-Y plane, and simultaneously or sequentially to move the pallet along the X axis until the conical locator is in simultaneous contact with the faces 20 and 22 on the fixed locator 12 and faces 24 and 26 on the pallet locator 16.

It will be noted that wear on the faces of the fixed locators 4 and the corresponding surfaces on the pallet 2 is minimized because the sliding movements encountered by these surfaces are only the X axis error correction movements, which are very small, and because the contact surfaces are area rather than line contacts. Furthermore, the forces these surfaces must react are small until the movement along the X axis is stopped.

In FIGS. 7 and 8, the wear on the faces 20, 22, 24 and 26 and on the conical locator 28 will be larger because only line contact is used; the effect of such wear on locating accuracy must be evaluated in terms of the specific angles of the faces 20, 22, 24 and 26 as arbitrarily measured from the Y axis.

Referring to FIG. 8, it can be seen that these angles are shown as being identical; this need not be the case. Indeed, all four angles could be different and there would still exist only one position of locator 16 along the X axis (the Y axis positioned being determined by locators 4) in which the conical locator 28 could be simultaneously mutually tangent to all four faces 20, 22, 24 and 26. However, with such non-identical angles, an assumed uniform wear on each face could result in a slight shift in the X position of locator 16 when simultaneous mutual tangency to conical locator 28 is reached. In order to eliminate this X position-shift due to assumed uniform wear, it is only necessary that the angles made by faces 24 and 26 with respect to the Y axis be identical and opposite to each other; and that the angles made by faces 20 and 22 with respect to the Y axis also be identical and opposite to each other. It is not necessary that the angles made by faces 24 and 26 with respect to the Y axis be the same as the angles made by faces 20 and 22 with respect to the Y axis. If these pairs of angles are different, the assumed uniform wear would not cause a shift in the X position of locator 16 but would cause a shift of the Y axis position of the conical locator 28 to achieve simultaneous mutual tangency with all four faces, which can be accommodated if the conical locator 28 is permitted to float with respect to its actuating mechanism, and move upward as needed.

The natural random rolling tendency of the conical locator 28, it its mounting permits this, will tend to distribute the wear uniformly around its periphery; such uniform wear is not harmful since it remains a cone and will only move further upward to achieve simultaneous mutual tangency with faces 20, 22, 24 and 26, provided its driving mechanism is capable thereof.

Summarizing, location accuracy need not be impaired due to wear if the faces 24 and 26 are equally and oppositely inclined to the Y axis, and if the faces 20 and 22 are also equally and oppositely inclined to the Y axis. If is also clear that the location of the pallet 2 does not depend on direct control of the axis of the conical locator 28; indeed, it is necessary that this conical locator 28 be permitted to find its own position between the four faces 20, 22, 24 and 26. Accordingly, the optimum mounting situation for the conical locator 28 is to have it float with respect to its supporting mechanism.

The location system, the theory of which has been outlined above, together with other improvements, is employed in the pallet registry mechanism described below.

FIG. 12 is a plan view of a pallet registry assembly, on which are superimposed four pallet feet 40 mounted on the pallet base 42, shown in plan view outline. Also mounted on the pallet base 42 are four blocks 44 which are engaged by fingers 46 on a transfer bar 48. The pallet 42 is moved from station to station by lineal motion of the transfer bar 48 through the fingers 46, when in position 46a (FIG. 13), in engagement with one of the blocks 44; before its return stroke, the transfer bar 48 is rotated about its own axis, disengaging the fingers 46 from the block 44, and the transfer bar 48 returns without moving the pallets with it. Four blocks 44 are provided on the pallet base 42 so that the pallet base 42 may be engaged by the transfer bar in any one of four positions of the pallet base 42 as will be explained. A pallet locator 50, having four sided symmetry, is also mounted to the pallet base 42, to cooperate with the registry location system.

Figure 13:
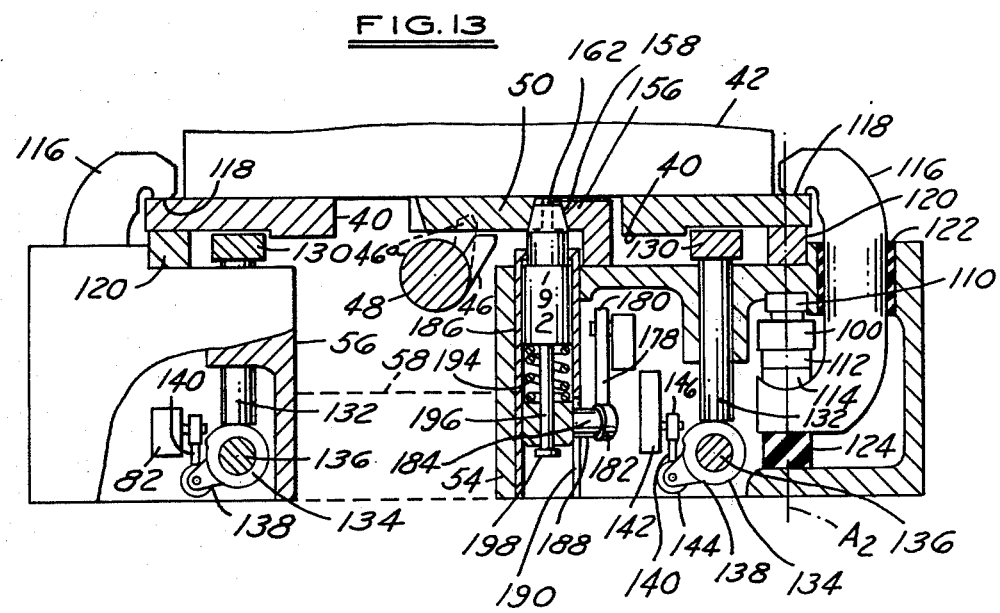
FIG. 13, a view on line 13—13 of FIG. 12.

Referring also to FIG. 13, a complete registry is made up of a primary housing 54 and a secondary housing 56, which optionally may be interconnected with an integral tie bar 58 shown dotted in FIGS. 12 and 13. With the tie bars 58 present, the registry housing becomes a single unit which is advantageous in increasing the rigidity; however, with the tie bars 58 absent, the registry is separated into two halves each of which may be removed from or replaced on the machine bed without removing the transfer bar.

An interrelated locating system and clamping system is associated with the primary housing 54, while a clamping system only is associated with the secondary housing 56.

Referring to the longitudinal sectional drawing (FIG. 14), a master bellcrank 60 is fastened to a torque tube 62 journalled on a shaft 64 mounted in the housing 54. This bellcrank 60 is actuated by an external push rod 66, driven by an external power system which drives multiple push rods 66 actuating a series of registries mounted along the machine. The other arm of the bellcrank 60 is connected through a wear rod 68 to a nosepiece 70 of a spring cartridge 72. The spring cartridge 72 is comprised of a mounting bracket 74 which loosely guides a tension rod 76, which at one end is connected to the nosepiece 70 and at its other end mounts a spring seat 78. A coil compression spring 80 is preloaded and mounted between the bracket 74 and the spring seat 78. With the spring cartridge 72 not assembled into the registry, it can be seen that the travel of the spring 80 is limited by the contact between nosepiece 70 and mounting bracket 74. It is, therefore, possible, through the use of an external preload fixture, to precompress the spring 80 before fastening the nosepiece 70 or spring seat 78 to the tension rod 76.

Figure 14:
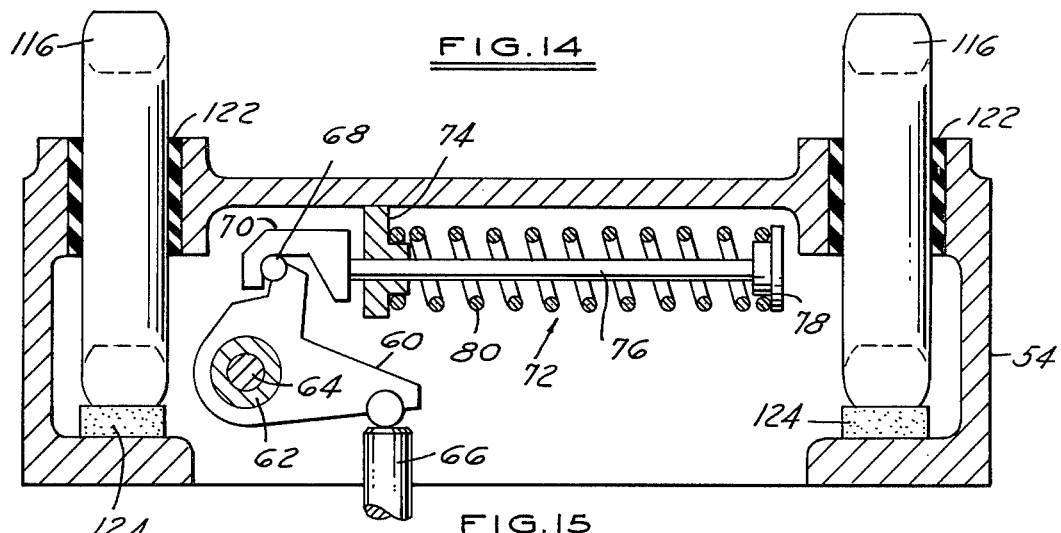
FIG. 14, a longitudinal section view on line 14—14 of FIG. 12 showing clamp mounts and an actuator mechanism.

It can be seen that the spring cartridge 72 exerts a clockwise torque on the bellcrank 60, while an upward movement of the push rod 66 causes a counterclockwise movement of the bellcrank 60; and this in turn causes the tension rod 76 to move to the left further compressing the spring 80. The bellcrank 60 is shown in FIG. 14 in its most clockwise position, at which point the registry has lowered, located and clamped a pallet, as will be explained. When the push rod 66 is raised by external means, the bellcrank 60 is positively driven in a counterclockwise direction through an angle of approximately 30° which unclamps and raises the pallet 42, and disengages the locating system; it also delivers energy or work into the cartridge 72. As the push rod 66 is lowered by external means, the bellcrank 60 is rotated clockwise by the spring cartridge 72 lowering, locating and clamping the pallet 42 through the work output of spring 80. Each registry can therefore adapt to the various dimensional variations in the clamp system to achieve full clamp pressure. The bellcrank 60 transmits its angular motion to the torque tube 62 which is the common actuator element for the lowering, locating and clamp systems.

The clamping system is shown in the longitudinal section (FIG. 15) and the transverse section (FIG. 13). The torque tube 62 has mounted to it a drive arm 82 in whose outboard end is formed an elongated slot 84. An intermediate link 86 is mounted on a shaft 88 journalled in the frame 54; the outboard end of the link 86 has mounted on it a coupling pin 90 which operates in the slot 84 in arm 82. A tie link 92 is pivotally connected to the link 86 by a pin 94; at its other end, the tie link 92 is pivotally connected to an equalizer link 96 by a pin 98; this connection to link 96 is at or near its midpoint. At its two ends, the equalizer link is connected to clamp levers 100 and 102 by pins 104 and 106 respectively. The two clamp levers are symmetrically opposite and each operates one of the two clamps.

The clamp lever 100, at its other end, has mounted on it a cylindrical insert 108 which rolls on a reaction pad 110 mounted in the housing 54. This slightly moving connection between the insert 108 and the reaction pad 110 is the fulcrum axis for the lever 100 and is noted as axis $A_3$. On the other side of the lever 100 is mounted a cylindrical insert 112 having a center on the clamp axis $A_4$. This insert 112 bears against the mating concave face of a shoe 114; the opposite face of shoe 114 has a convex cylindrical face which mates with a concave face of the clamp member 116. This clamp member 116 has a "C" configuration, FIG. 13, with a substantially straight cylindrical body having an extended integral lower section which mates with shoe 114 and an extended integral upper section with a clamp face 118 which bears against the upper surface of the pallet foot 40 during clamping. The pallet foot 40, during clamping, is supported by locator pad 120 mounted on the housing 54. The cylindrical body of the clamp member 116 is guided in an elastomeric bushing 122, such as neoprene or urethane, mounted in the housing 54. The lower end of the clamp member 116 rests on an elastomeric pad 124, which functions as the clamp return element. The clamping components associated with the symmetrically opposite clamp lever 102 are identical with those associated with the clamp level 100 as described above.

It will be recalled that the clamps are actuated by a clockwise rotation of the torque tube 62; this causes the arm 82 to rotate clockwise which in turn causes pin 90 and 94 on link 86 to move downward. This movement is transmitted to the equalizer link 96 by tie link 92. It will be noted that the equalizer link 96 transmits this movement through pins 104 and 106 to clamp levers 100 and 102 respectively, and provides an equal force to these clamp levers 100 and 102. The clamp lever 100 rotates clockwise about the fulcrum axis $A_1$, and, through the shoe 114 forces the clamp member 116 downward, compressing the elastomeric pad 124 and closing the clearance between the upper surface of pallet foot 40 and clamp face 118. The clamp lever 102 rotates counterclockwise and actuates the clamp member 116 associated with it downward in an identical fashion. When both clamp members 116 are exerting their clamp force against the two pallet feet 40, the rotation of the torque tube 62 is stopped, although a clockwise torque is still being applied to the torque tube 62 by the spring cartridge 72. The clamp system is in equilibrium between the force of the spring cartridge 72 and the reactive force of the pallet feet back to the faces 118 of the clamp members 116. A highly reproducible clamping force is thereby attained. When this equilibrium condition is achieved, a small gap will appear between the push rod 66 (FIG. 14) and the contact surface of bellcrank 60. The magnitude of this gap is dependent on the various error and/or wear (stack up) of all the components involved in the clamping system including the pallet feet 40.

Several features of this clamping technique are to be noted. The clamping force applied to the clamp member 116 by the lever 100 through shoe 114 is applied on the same axis $A_4$ as the clamp force applied by the clamp member 116 to the pallet shoe 40; i.e., these two forces act on coincident axes. The clamp member 116 will deflect slightly, but since it is mounted in the housing 54 through an elastomeric bushing, these deflections impose no significant loads on the housing 54. The only significant reactive loads on the housing 54 due to the clamping forces are a compressive load equal to the clamp force which exists between the locator pad 120 and the reaction pad 110 and a moment equal to the clamp force times the distance between axis $A_3$ and axis $A_4$; other much smaller forces are created by the reaction loads on shafts 64 and 88 and the spring cartridge support 74. These forces are considerably smaller because of the high mechanical advantage of clamp levers 100 and 102.

The unclamp sequence is caused by the upward movement of push rod 66, FIG. 14, which rotates bellcrank 60 and torque tube 62 counterclockwise and compresses spring 80. Arm 82 is rotated counterclockwise lifting links 92 and 96 upward; this rotates clamp lever 100 counterclockwise and clamp lever 102 clockwise. The resilient pads 124 expand upward forcing the clamp members 116 to move up as permitted by the shoes 114. The clamp members 116 relieve their clamp force on the pallet shoes and continue upward to create a clearance between the upper faces of the pallet feet 40 and the clamp forces 118 of the clamp members 116.

Since the slide rails on which the pallet moves are subject to wear, it is desirable that they be eliminated from the accurate location functions which are the object of the present invention. This is accomplished in the following manner.

The rotation of the torque tube 62, in addition to operating the clamp system just described, also slightly lifts and lowers the slide rails 130 (FIGS. 12 and 13) on which the pallet base 42 is supported through pallet feet 40 as it is moved by the transfer bar 48. Referring to FIGS. 12 and 13, the slide rails 130 are shown in their down position when the pallet feet 40 are resting on locator pads 120 and clamped by clamp members 116. A slight clearance will be noted between the upper surface of the slide rails 130 and the mating surface of the pallet feet 40; when clamped, the pallet is, therefore, supported only by the locator pads 120. When the pallet 42 is fully unclamped, the slide rails 130 move upward slightly to contact and lift the pallet feet 40 upward and a slight clearance develops between the upper surface of the locator pads 120 and the corresponding contact surfaces of the pallet feet 40. The surfaces on the pallet feet 40 which contact the locator pads 120 never contact the slide rails 130 and the surfaces on the pallet feet 40 which contact the slide rails 130 never contact the locator pads 120. This is very important since wear on the pallet feet 40 and/or slide rails 130, due to pallets sliding on slide rails 130 during transfer, does not influence final pallet location in the vertical plane. The only sliding which takes place on the locator pads 120 is the small movement which takes place in the locating process which only corrects pallet location errors due to slight transfer inaccuracies.

Figure 16:
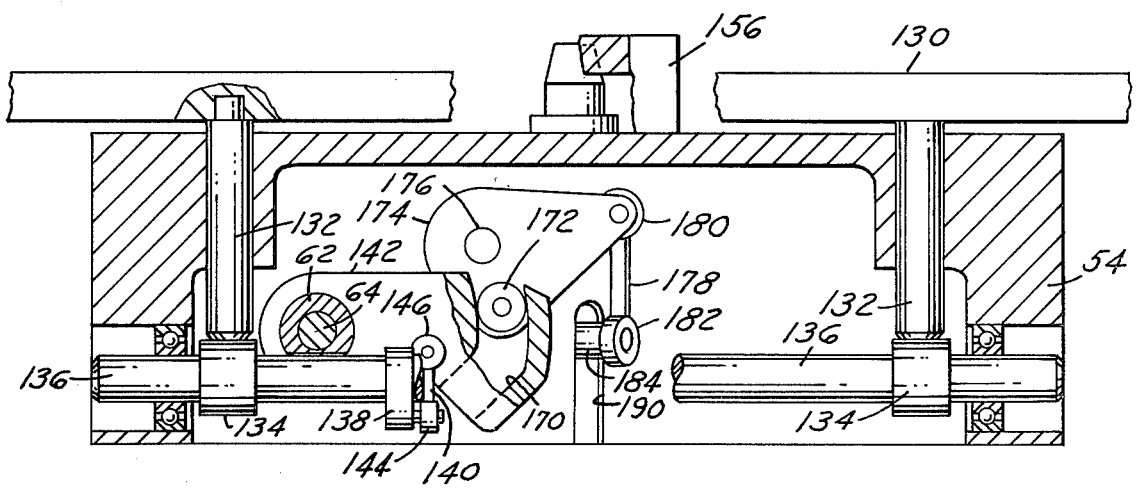
FIG. 16, a section on line 16—16 of FIG. 12.

Referring to FIGS. 13 and 16, each slide rail 130 is supported by two rods 132 which can slide vertically in the housing 54. The lower ends of the rods 132 ride on cams 134 mounted on an auxiliary shaft 136. An actuator arm 138 is also mounted to shaft 136; the outboard end of this arm 138 is connected to and driven by a link 140 connected to a cam arm 142 (FIG. 16) mounted on the torque tube 62. Since the shaft 136 and torque tube 62 rotate on axes which lie at right angles to each other, the arm 138 and the arm 142 rotate in planes which are at right angles. Accordingly, the link 140 is connected at one end to the arm 138 through a spherical bearing 144; at its other end, the link 140 is connected to the cam arm 142 through a spherical bearing 146. Since the rotation of both the torque tube 62 and the shaft 136 is through relatively small angles, this spherical bearing and link connection is satisfactory.

It can be seen that when the torque tube 62 rotates in the counterclockwise direction (as in unclamping) the cam arm 142 moves the link 140 upward. This causes the shaft 136 to rotate clockwise, as viewed in FIG. 13; and this causes the cams 134 to lift the rods 132 which support a slide rail 130. The slide rails 130 contact the pallet feet 40 to lift them slightly from contact with locator pads 120. The pallet 42 is slid out of the registry in this configuration and the next pallet enters.

Similarly, it can be seen that during the clamping sequence, the slide rails 130 are lowered and the pallet feet 40 are supported by the locator pads for clamping. As the torque tube 62 rotates clockwise, for clamping, the link 140 moves downward causing the shaft 136 to rotate counterclockwise; the cams 134 mounted thereon permit the rods 132 to move downward with the slide rail 130 as driven by the weight of the pallet 42. In actual operation, no clearance may develop between the upper surface of slide rail 130 and pallet feet 40 but this is of no consequence as long as the pallet feet 40 are located by locator pads 120. Indeed, it is desirable that clearance does not develop since then foreign material such as chips cannot enter. A positive method to prevent clearance from developing will subsequently be disclosed.

In addition to the clamping and slide rail vertical movement generated by the rotation of the torque tube 62, the locating sequence is also operated thereby. As a pallet 42 is moved into a given registry by movement of the transfer bar 48, the inner vertical faces 150 of two pallet feet 40 either clear or lightly contact two Y axis locators 152 mounted on upward extending protrusions 154 on the housing 54; this is also shown in the partial vertical section (FIG. 17). These locators 152 are the functional equivalent of the locators 4 in FIG. 1–6.

A fixed locator 156 is mounted to the housing 54 and is the functional equivalent of the fixed locator 12 in FIGS. 7–11. This locator 156 has two accurately positioned faces 158 which are inclined to a line perpendicular to the plane of locators 152, in any horizontal plane, and which are also inclined with respect to the vertical Z axis. A corresponding locator 50, previously noted, is mounted on the underside of the pallet base 42. This locator has four sides which are symmetrically disposed about the central vertical axis of the pallet. Only one of these sides is relevant to the location of a pallet in any one given attitude, that side which is parallel to and adjacent to the locator 156 on the housing 54. Considering this one side only, it has two accurately positioned faces 160 which are inclined to a line perpendicular to the plane of the locating surfaces 150 on feet 40, in any horizontal plane, and which are also inclined with respect to a vertical axis. The vertical inclination of the faces 160 on locator 50 and faces 158 on locator 156 are such that they can be mutually tangent to a cone having a vertical axis, if the locator 50 is properly aligned with the locator 156 in the X plane. In effect, the locator 50 is analogous to locator 16 in FIGS. 7-11.

A conical locator 162 in the form of a frustcrum of a cone is moved vertically into and out of the four-sided pyramidal interspace created by faces 158 on locator 156 and faces 160 on locator 50 by a mechanism actuated by the rotation of the torque tube 62. Referring to FIG. 16, the cam arm 142 mounted on torque tube 62 has cut into it a contoured cam groove 170 in which is guided a cam follower roller 172. This roller 172 is mounted on a bellcrank 174 which is mounted on a shaft 176 journalled in the housing 54. A link 178 operating in a substantially vertical plane is connected at its upper end to the bellcrank 174 through a spherical bearing 180. Referring also to FIG. 13, the lower end of link 178 is connected through a spherical bearing 182 to a sliding driver sleeve 184. This sliding driver sleeve 184 is mounted in a long bushing 186 in which the sleeve 184 can slide vertically. It will be noted that the spherical bearing 182 is connected to the sleeve 184 through a boss 188 on the sleeve 184 which extends through a slot 190 in the bushing 186.

A secondary sliding member 192 is also slidably mounted in the bushing 186; it is connected to the sleeve 184 through a compression spring 194 and a preload rod 196. The preload rod 196 is concentrically mounted in the sliding member 192 and passes through a loose fitting hole in the sleeve 184, below which a head 198 is formed on the rod 196. This rod 196 is used to create a predetermined preload on the spring 194.

The conical locator 162 is mounted to the top of the sliding member 192 in a manner that permits it to float thereon. Referring to the partial sectional drawing FIG. 18, the conical locator 162 is fastened to the top of the sliding member 192 with a single concentric screw 200. An elastomeric washer 202 is positioned between the bottom face of the conical locator 162 and the upper face of the sliding member 192. A relatively large clearance is provided between the inside diameter of the conical locator 162 and the outside diameter of the screw 200. The conical locator 162 is held concentric with the screw, under no load conditions, through two elastomeric "O" rings 204, made of neoprene or comparable material. This type of mounting permits the float required of the conical locator 162, and also permits it to rotate for uniform wear distribution.

The mechanism position shown in FIGS. 13 and 16 shows the torque tube 62 rotated as far clockwise as permitted by the clamp member 116 equilibrium and the conical locator 162 is held upward into the interspace between locators 50 and 156 with a force determined by the preload on spring 194. During the unclamp cycle, the torque tube 62 rotates counterclockwise carrying the cam arm 142 with it. It can be seen that after approximately midstroke, the cam roller 172 is moved to the left by cam groove 170 as viewed in FIG. 16; this causes a clockwise rotation of the bellcrank 174 about the axis of shaft 176. The link 178 moves downward driving the sleeve 184 downward also. After a very short downward movement of the sleeve 184, during which interval the spring 194 expands, the sleeve 184 contacts the head 198 of the rod 196. From this point onward, the sleeve 184, sliding member 192, and conical locator 162 move downward together, until the conical locator 162 is completely clear of the locators 50 and 156; this corresponds to the full counterclockwise position of the torque tube 62.

The locating sequence is the exact converse. This occurs during the clockwise rotation of the torque tube 62. During approximately the first half of this rotation, the cam roller 172 is driven to the right as viewed in FIG. 16; this causes the bellcrank 174 to rotate counterclockwise about the axis of shaft 176 raising the link 178. The sleeve 184, spring 194, sliding member 192, and conical locator 162 move upward together as driven by link 178. The conical locator 162 forces the pallet 42 into its final located position, at which time it is simultaneously tangent to all four faces 158 and 160 and its further upward movement is prevented. The preloaded spring 194 is then compressed slightly as the sleeve 184 is driven to the top of its stroke by the link 178, bellcrank 174, cam follower 172, and cam groove 170. This compression of spring 194 serves two useful purposes; it limits the upward force exerted by the conical locator on the locators 50 and 156, and it automatically compensates for the wear on all three locators 50, 162, and 156.

As noted in connection with the locating process described for FIGS. 7 to 11, the conical locator 162, in being permitted to float with respect to sliding member 192, establishes a position for the pallet locator 50 relative to the locator 156 on the registry such that the conical locator 162 is simultaneously tangent to the two faces 160 and the two faces 158. The pallet location is determined solely from the locator 156 and slight errors or wear in the lift and guidance mechanism for the conical locator 162 is of no consequence.

It can be seen from the shape of the cam groove 170 that the raising of the conical locator 162 and its associated mechanism is generated during approximately the first half of the clockwise rotation of the torque tube 62 and cam arm 142. During the remaining approximate half of the clockwise rotation of the torque tube 62 and cam arm 142, the cam roller 172 is in dwell and no further motion of the bellcrank conical locator 162 and intermediate details takes place. During this interval of the cam arm 142 rotation, the cam roller 172 engages a portion of the cam groove which is a true radius about the centerline of shaft 64. This is desirable since it insures that the conical locator 162 has fully located the pellet before the clamp members 116 clamp the pallet feet 40, and that no motion of the locating system occurs during the clamping process.

It can be seen from a study of the locating system shown in plan view in FIG. 12 that the Locating Ratio, as previously defined, is very large, i.e., the ratio of the distance between the fixed locators 152 to the distance between the line connecting the fixed locators 152 to the locating force application point, faces 160, is very large. It can further be seen that since the faces 160 on the locator 50 are on the opposite side of fixed locators 152, the pallet base 42 is pulled into location rather than being pushed into location, which is a more desirable condition. The pallet base 42 is located solely from the locating mechanism which is housed in or mounted on the housing 54.

As described above, this housing 54 also contains mechanisms which clamp the pallet and raise the one transfer rail slightly during pallet transfer. The mechanism housed within the secondary housing 56 is substantially identical with the mechanism housed within the primary housing 54, except that the entire operating mechanism associated with the conical locator 162 does no exist within the secondary housing 56. The secondary housing 56, as shown in FIG. 16, contains the spring cartridge and clamp mechanism shown in FIGS. 14 and 15 and it also includes the shaft 136, cams 134, rods 132, and vertically moving slide rail 130. The torque tube 62 is shortened and the cam 174 does not exist. The link 140 is now connected to the arm 82 mounted on the torque tube 62 rather than the non-existent cam arm 142. The mechanism for clamping and raising and lowering of the slide rail 130 in the secondary housing 56 is actuated by a duplicate push rod 66 actuated by the same external drive system which actuates the push rod 66 associated with the primary housing 54.

It can be seen from the plan view, FIG. 12, that the pellet base 42 has four way symmetry, the pallet could be rotated 90° and appear exactly as it does before rotation. This condition is created by having four symmetrically disposed pallet feet 40 mounted equidistant from the pallet 42 centerline, and by designing the pallet locator 50 such that it has four identical sides, each with the inclined angled locator faces. Therefore through the use of suitable rotate-stations positioned as required along the line of travel of the pallets as they move through a multiple station transfer machine, the pallets may be rotated in 90° intervals and still be located and clamped by the aforesaid registry mechanism. This technique is very useful in that it makes workpiece faces accessible for operations that would otherwise required refixturing.

As described above, the total registry mechanism lowers the pallet 42 slightly on the slide rails 130, locates it with an upward moving floating conical locator 162, and clamps it with four clamp members 116. This must be accomplished in exactly the correct sequence, as is very easily accomplished with the fully mechanically interrelated motions. An illustrative timing chart is shown in FIG. 19, which shows the movement generated by the torque tube 62 in the conical locator 162, pallet (slide) rails 130 and clamps 116, to accomplish the required interrelationships.

The conical locator 162 has been shown and described as a cone which causes the pallet to be located by forcing itself to become mutually tangent to four locator surfaces 160 and 158, two on the pallet locator 50 and two on the registry locator 156. In such a position, the conical locator 162 is in line contact with these four faces. An alternate design for the conical locator is shown in plan view in FIG. 20 and in side view in FIG. 21. This alternate pyramidal tapered locator 206, is provided with four locator faces 208, essentially a frustrum of a pyramid, which, when final pallet location is achieved, are simultaneously in contact with the faces 158 and 160 on the registry locator 156 and pallet locator 50. Location is therefore achieved through area contact, rather than line contact as with the conical locator 162. This area contact is advantageous, since it is less susceptible to wear; on the other hand, it has a greater susceptibility to trapping of dirt, chips or other contaminants between the locating surfaces. In any case, the tapered locator can be conical in form as shown by the locator 162 or pyramidal in form as shown by the locator 208, each with its particular advantages.

It will be recalled that the slide rails 130 are moved up and down slightly as supported by the rods 132, which are driven by cam 134. In some installations, when the slide rails are in their lowermost position, it may be desirable that the slide rails 130 remain in contact with the underside of the pallet feet 40 to prevent the entry of chips or other contaminants. Since this is an indeterminate condition, depending on the degree of wear on the top of the rails 130 and the associated areas of the pallet feet 40, as well as the slight dimensional manufacturing errors of the rods 132 and cams 134, other means are required.

Two techniques for maintaining the slide rails 130 in contact with the pallet feet 40, even when the cams 134 are in their full down position, are shown in FIGS. 22 and 23. In FIG. 22, a rail support rod 210 (replacing rod 132) supports the slide rail 130 as before, and its lower end is actuated by a cam 134 like that shown in FIG. 13. The rod 210 is slidably mounted in the frame 54, and is additionally mounted in a commercially standard rubber bushing 212, comprised of an outer flanged metal shell 214, an inner metal sleeve 216, and a rubber, or other elastomer, bushing 218 bonded to each. The shell 214 is press fitted into the frame 54, and the rod 210 is axially supported by the the sleeve 216 through a shoulder 220 on the rod 210. The bushing 212 deflects in shear during the vertical movement of the rod 210, and it is biased so as to exert an upward force on the rod 210 which is less than the weight of the pallet 42 but more than the weight of the rail 130 and rod 210. Therefore, as the cam 134 lowers the rod 210, rail 130, and pallet 42, they move downward against the bias of the rubber bushing 212, until the pallet feet 40 contact the locators 120, establishing the vertical position of the pallet 42. Since the pallet 42 is now so supported, it no longer exerts a downward force on the rails 130, which then no longer move further downward against the upward bias of the rubber bushing 212, even though the cam 134 permits a slight further downward movement. In essence, the upward bias of the bushings 212 prevents a gap from opening between the rails 130 and the pallet feet 40, yet permits the pallet 42 to move up and down slightly as previously described.

Another way of accomplishing this same upward bias on the rails 130 is shown in FIG. 23. In this case, the rail 130 is supported by a rod 222, replacing rod 132; the rod 222 is again slidably supported in the housing 54. A shoulder 224 on an enlarged section of the rod 222 is supported by a compression spring 226 which in turn is supported by a shoulder 228 formed in the housing 54. This compression spring 226 is preloaded and exerts an upward force on the rod 222 which is less than the weight of the pallet 42, but greater than the weight of the rail 130 and rod 222. Accordingly, the spring 226 prevents the rails 130 from moving downward from the pallet feet 40 when they are supported by the locators 120, as has been described in connection with the rubber bushing 212 in FIG. 22.

Reverting to FIG. 14, the spring cartridge 72 shown there utilizes a coiled wire spring operating in compression. Another type of spring cartridge is shown in FIG. 24; in this design, the elastic element is comprised of a stack of disc springs, also referred to as Belleville washers. Referring to FIG. 24, a pull rod 230 is connected to the nosepiece 70 (as in FIG. 14); the other end of the pull rod 230 is formed into a head 232. A stack of disc springs 234 are concentrically positioned and preloaded on the pull rod 230 between the head 232 and an internal flange 236 on a sleeve 238; this sleeve 238 is also provided with a mounting lug 240 through which it is attached to the housing 54. Each disc spring 234 is a conical shaped washer, which in compression becomes more nearly planar. A stack of disc springs 234, as in FIG. 24, is generally to be preferred over a more conventional wire coil spring because a larger amount of work or energy can be stored in a given volume.

An alternate design for the spring cartridge, while still using disc springs, is shown in FIG. 25. Here a stationary sleeve 242 is mounted to the housing 54 through a mounting lug 244 which is also formed into a shoulder or external flange 246. A series of disc springs 250 is stacked on the outside of the sleeve 252 and bear againt the flange 246.

At the other end of sleeve 242, ths stack of disc springs 250 is preloaded against a shouldered washer 252, which is held in place by a thin flat keeper 254 extending across a diameter of the washer 252 passing through two longitudinal slots 256 in the sleeve 242 and also passing through a slot 258 in a pull rod 260. At its other end, the pull rod 260 mounts the nosepiece 70. It can be seen that the tensile load in pull rod 260 is transmitted by the keeper 254, acting as a beam, into a compressive load on the stack of disc springs 250. As the pull rod 260 moves through its stroke, as determined by the mechanism, the keeper 254 remains loaded against the right side of slot 258 in pull rod 260, but the keeper 254 moves freely through the clearance slots 256 in sleeve 242.

Figure 15:
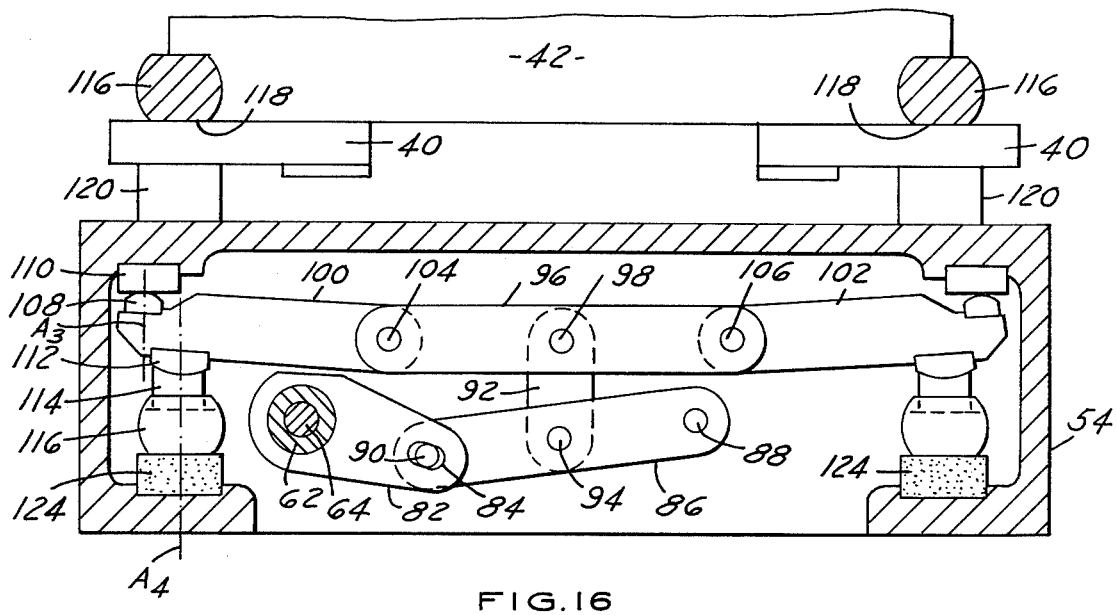
FIG. 15, a section on line 15—15 of FIG. 12.

Referring to FIGS. 13, 14 and 15, it will be recalled that the resilient pad 122 is utilized to return the clamping member 116 to its unclamped and clearance position upon release of the clamp force generated by clamp lever 100. It will be understood that alternate elastic return systems can be used to create this same return force, among which, by way of illustration, are, a conventional wire coil spring acting in compression, or a short stack of disc springs comparable to those shown in FIGS. 24 and 25.

In the previous descriptions of the locating system, the axis of the moving tapered locator was shown as being substantially parallel to the Z axis. This need not be the case; there are some advantages to slightly inclining the axis of the tapered locator and the axis on which it moves into the interspace between the locator on the pallet and the corresponding fixed locator on the registry. Such a system is shown in FIGS. 26 and 27. Referring to these figures, a locator 232 is mounted to the underside of the pallet 42 and is analogous to the locator 50 previously described. It incorporates two faces 234 and 236 which are oppositely inclined to the Y axis and which are parallel to the Z axis; i.e., they are perpendicular to the X-Y plane. It will be understood that the locator 232 may also have four sided symmetry and that each side incorporates faces corresponding to faces 234 and 236.

A fixed reference locator 238 is mounted to the registry frame 54 and is analogous to the fixed reference locator 156 previously described; it incorporates two faces 240 and 242 which are also oppositely inclined to the Y axis, and additionally inclined to the Z axis.

A conical locator 244, analogous to the previously described conical locator 162, is configured to be simultaneously tangent to faces 234, 236, 240 and 242 when the pallet locator 232 is properly located with respect to the registry mounted fixed reference locator 238. The conical locator 244 is resiliently mounted on an actuating member 246, analogous to member 192 previously described. Both the axis of the conical locator 244 and the path of the actuating member are along an inclined axis $A_5$. The operation of this system of location is substantially the same as previously described, in that the conical locator 244 is forced upward until simultaneous tangency with the four faces 234, 236, 240 and 242 is achieved. This system differs from that previously described only by being rotated in space through a small angle such that faces 234 and 236 become perpendicular to the X-Y plane. It can be seen that the relatively small inclination of the axis $A_5$ causes only small changes in the forces which bring the locator 232 and the pallet, on which it is mounted, to its final located position. The practical advantage of this inclination of axis $A_5$ are twofold: first, the lifting forces on the locator 232 and therefore on the pallet, are significantly reduced; and, secondly, the manufacturing costs on the locator 232, which has four identical pairs of locating faces, are reduced, since these locating faces are now on simple rather than compound angles or inclinations.

This system, using an inclined axis $A_5$, can also be used with a pyramidal tapered locator as previously described. For manufacturing convenience, the faces 234, 236, 240 and 242 as well as the previously described faces 160 and 158 have been shown as planes. This need not be. It is sufficient that these faces be reproducible surfaces, generally converging to a common apex and capable of having four lines or areas of tangency with a tapered locator.

The tapered locators 244 or 162 or 206 have been shown as being mounted on a member which moves in a straight line to carry the tapered locator into the interspace between the pellet locator and registry locator until four line tangency is reached. It can be seen that a pivoted or parallelogram type motion for moving the tapered locator to its final locating position is also suitable if the arcuate path so generated is sufficiently close to a straight line to be compensated for by the aforementioned float made possible by the resilient mounting of the tapered locator on its supporting member.

Referring again to FIG. 14, it will be recalled that the entire registry mechanism is actuated by an externally driven push rod 66, which, in driving the torque 62 counterclockwise, releases the clamp, withdraws the tapered locator, and lifts the pallet slightly upward off the vertical locators. Any one of a wide variety of mechanisms is suitable to accomplish this. If the multiple registries of a multiple station machine are to be independently actuated, a simple air or hydraulic cylinder can be used in place of the push rod 66.

In another arrangement, FIG. 28, all the push rods 66 associated with the multiple registries of a multiple station machine are operated from a single source. Two machine beds 250 are shown for illustrative purposes; it will be understood that there may be multiple additional machine beds 250 with their associated mechanisms. A registry frame 54 is mounted on each machine bed 250, and the slide rails 130 span the registries 54. The machine beds are interconnected by spacers 252. A bellcrank 254 is pivoted in each machine bed 250 through a shaft 256; each bellcrank consists of a short horizontal arm 258 and a long vertical arm 258. The outboard end of each arm 258 is pivotally connected to a push rod 66. The outboard lower ends of the arms 258 are pivotally interconnected by links 260 which lie in substantially horizontal planes. One of the arms 258 is driven by an air or hydraulic cylinder 262. It can be seen that as the cylinder 262 retracts, all the bellcranks 254 rotate clockwise in unison causing the push rods 66 to move upward in unison; this unclamps all registries, retracts the tapered locators, and lifts the pallets slightly upward on the rails 130. When the cylinder 262 extends, all bellcranks 258 rotate counterclockwise, lowering the push rods 66 and permitting the internal spring cartridges to lower, locate and clamp the pallets.

The use of a cylinder with this linkage is illustrative only; it will be understood that the horizontal movement of the links 260 can be generated by a gear reducer, driven by an electric motor, and having a crank on its output shaft connected to one of the arms 258 by a suitable connecting rod. The multiple bellcrank linkage can also be advantageously driven by one of the mechanisms described in my U.S. Pat. Nos. 3,789,676, 3,857,292 and 4,075,911.

Another means for actuating all the push rods in unison is to mount a long torque tube horizontally through the machine beds, suitably journalled therein, which is oscillated through a small angle about its horizontal axis. At each station, an arm is fastened to the torque tube and the outboard end of each arm drives the vertically moving push rod 66 through a pivot connection. The torque tube in turn is driven by a suitable arm, fastened thereon, which in turn may be driven by a cylinder, connecting rod, crank, gear reducer and motor, or the like. It can be seen that two torque tube assemblies are required, one to operate the push rods on one side of the registry line, and a second to drive the push rods on the other side of the registry line.

The above-described mechanisms are all addressed to actuating the registries through the push rods 66. The registries can be altered to make them operable by other means. One such alteration is shown in FIG. 29; the bellcrank 60 (FIG. 14) is replaced by a master lever 270 attached to the torque tube 62. The upper end of the lever 270 is still operated by the spring cartridge 72 through a tension rod 76 and nosepiece 70 and wear rod 68; but whereas the bellcrank 60 had been operated by a vertically moving push rod 66, in the alternate arrangement (FIG. 29) the torque tube 62 is driven by the downwardly extending portion of the master lever 270 from a suitable horizontal actuating system. It can be seen that a horizontal movement to the right imparted to the lower end of master lever 270 causes the torque tube 62 to rotate counterclockwise thereby releasing the clamps, withdrawing the tapered locator, and slightly lifting the slide rails; a release of the force causing this movement to the right of the lower end of master lever 270 permits the spring cartridge to rotate the torque tube 62 clockwise, lowering the rails, extending the tapered locator, and clamping the pallet.

An illustrative system for actuating the master levers 270 is shown in FIG. 30. A pallet registry 54 is mounted on each machine bed 250. Two stations are shown; it will be understood that the actuating system extends through as many stations as exist for the overall transfer machine. An actuator bar 272 extends through the machine beds 250; it is intermittently supported by rollers 274 mounted on the machine spacers 276. At its one end the actuator bar 272 is driven by an air or hydraulic cylinder 278 mounted on the machine bed 250. A series of actuating pins 280 are fastened to the bar 272. These extend transversely to one side of the bar 272 to operate in the plane of the master levers 270, which are disposed to one side or the other of the plane of the bar 272. When the cylinder 278 retracts, the actuator bar 272 moves to the right, and the pins 280 contact the master levers 270, driving them counterclockwise and unclamping the registries. When the cylinder 278 extends, the bar 272 moves to the left and the resulting motion of the pins 280 permits the spring cartridges in the registries to move the levers 270 with them; as each registry reaches its equilibrium clamped position, its lever 270 stops moving, and a small gap develops between each lever 270 and its corresponding actuating pin 280.

In the preceding descriptions, it was assumed that the pallet feet 40 and the rails 130 operated in a substantially horizontal plane, as represents the very great majority of applications. It was within this context that the term "vertical" applied, especially as related to the movement of the tapered locator. It will be understood that the registries can also be operated with the rails and pallet feet operating in non-horizontal planes, in which case the term "vertical" will be understood as being substantially perpendicular to the plane of operation.

I claim:
1. In a multiple station transfer machine in which workpieces are located and supported in pallets, and in which said pallets are sequentially moved along a transfer line and precisely located in each station for a work operation, that improvement which comprises:
   (a) a registry frame,
   (b) support means for pallets at each station on said frame,
   (c) two fixed spaced lateral locator surfaces on said frame at each station,
   (d) two fixed lateral locator surfaces on each pallet spaced similarly to those on the frame,
   (e) a first lateral force application surface on said frame spaced between said locator surfaces on said frame and a predetermined distance away from a line connecting said locator surfaces,
   (f) a second lateral force application surface on each said pallet located to register substantially with said first lateral force application surface when a pallet is brought to a particular station,
   (g) each said lateral force application surface presenting non-parallel spaced areas angled with respect to each other and angled obliquely with respect to the line connecting said locator surfaces, and
   (h) means to interfit complementally with said spaced areas of said first and second lateral force application surfaces and movable into engagement with said first and second surfaces to move said force application surfaces with respect to each other to move a pallet into a proper registry position wherein said lateral locator surfaces of said frame and a pallet are in positive contact, and said first and second force application surfaces are positioned in desired final registration with respect to each other.

2. A transfer machine as defined in claim 1 in which said means to interfit complementally with said spaced areas of said first and second lateral force application surfaces comprises a plunger mounted to be movable in direction transverse to the plane of a pallet to cam said force application surfaces into registry.

3. A transfer machine as defined in claim 1 in which transfer rails extend between said stations for carrying said pallets, and means to move said rails away from a said pallet at a station to cause said pallets to be supported on said support means independent of said rails.

4. A transfer machine as defined in claim 3 in which actuator means is associated with said interfit means and said rail moving means to sequentially move said rails away from said pallets and actuate said interfit means to locate a pallet.

5. In a multiple station transfer machine in which workpieces are located and supported in pallets, and in which said pallets are transferred sequentially through said machine, and precisely located in each station along an X axis which is parallel to the direction of pallet transfer, and along an Y axis which is perpendicular to the direction of pallet transfer, and along a Z axis which is generally vertical and perpendicular to said X and Y axes, and angularly located about said X, Y, and Z axes, registry mechanisms for locating and clamping said pallets each of which comprises:
(a) a registry frame,
(b) locating means comprising:
1. support means for said pallet on said frame,
2. two fixed pallet Y locator surfaces on each pallet lying substantially in the X-Z plane,
3. two fixed registry Y locators on said registry frame lying substantially in the X-Z plane,
4. a pallet X-Y locator on each said pallet incorporating two locating faces oppositely inclined to said Y axis,
5. a registry X-Y locator on said registry frame incorporating two locating faces oppositely inclined to said Y axis, and
6. a tapered locator mounted for movement in said registry frame and adapted to enter the interspace between said faces of said X-Y locators thereby forcing said pallet X-Y locator into a predetermined relationship with said registry X-Y locator and forcing said pallet Y locators into contact with said registry X locators establishing a precise predetermined position of said pallet relative to said registry frame.

6. A multiple station transfer machine as defined in claim 5 including: clamping means on said registry frame adapted to clamp said pallet to said support means, and actuating means adapted to actuate in sequence said locating means to locate said pallet and thereafter to actuate said clamping means.

7. A registry mechanism as in claim 6 which further comprises a locator support member mounted for movement in said registry frame and operated by said actuating means and on which said tapered locator is mounted.

8. A registry mechanism as in claim 7 in which said tapered locator is non-rigidly mounted to said locator support member.

9. A registry mechanism as in claim 7 in which said tapered locator is mounted to said locator support member through resilient means.

10. A registry mechanism as in claim 6 in which said tapered locator is driven by cam means comprising a part of said actuating means.

11. A registry mechanism as in claim 10 in which said cam means is shaped to cause a dwell of said tapered locator actuation during the engagement of said clamping means.

12. A registry mechanism as in claim 6 in which said tapered locator is driven through a deflectable member which absorbs excess movement created by said actuating means after said tapered locator has reached simultaneous contact with said two faces of said pallet X-Y locator and contact with said two faces of said registry X-Y locator.

13. A registry mechanism as in claim 12 in which said deflectable member comprises a preloaded spring member.

14. A registry mechanism as in claim 5 in which the distance between said two fixed pallet Y locators in the X direction is greater than twice the distance in the Y direction between said pallet X-Y locator and the line connecting said two fixed pallet Y locators.

15. A registry mechanism as in claim 5 in which said tapered locator comprises a frustrum of a cone proportioned to be simultaneously in contact with said two faces of said pallet X-Y locator and in contact with said two faces of said registry X-Y locator when said pallet is in said predetermined position on said registry.

16. A registry mechanism as in claim 5 in which said tapered locator is a frustrum of a pyramid proportioned to be simultaneously in contact with said two faces of said pallet X-Y locator and in contact with said two faces of said registry X-Y locator when said pallet is in said predetermined position on said registry.

17. A registry mechanism as in claim 5 in which said pallet X-Y locator has four sided symmetry and a total of eight locating faces, whereby said pallet may be located on said registry in any one of four predetermined rotated positions.

18. A registry mechanism as in claim 5 in which said two faces of said pallet X-Y locator each lie in planes which are substantially perpendicular to the X-Y plane and in which the path of movement of said tapered locator is along a line inclined to said X-Y plane.

19. A registry mechanism as in claim 5 in which the path of movement of said tapered locator is along a line substantially perpendicular to the X-Y plane and said two faces of said pallet X-Y locator and said two faces of said registry X-Y locator lie in planes inclined to said X-Y plane.

20. A registry mechanism as in claim 5 in which said two faces of said pallet X-Y locator lie in planes which are equally and oppositely inclined to the Y-Z plane.

21. A registry mechanism as in claim 5 in which said two faces of said registry X-Y locator lie in planes which are equally and oppositely inclined to the Y-Z plane.

22. A registry mechanism as in claim 6 which further comprises:
(a) rail means mounted for slight vertical movement on said frame, and adapted to provide a surface on which said pallets are slid into and out of said registry frame,
(b) means for shifting said rail means vertically interconnected with said actuating means, whereby said rail means may be lowered to bring said pallets into contact with said support means prior to said actuation of said locating means and said clamping means.

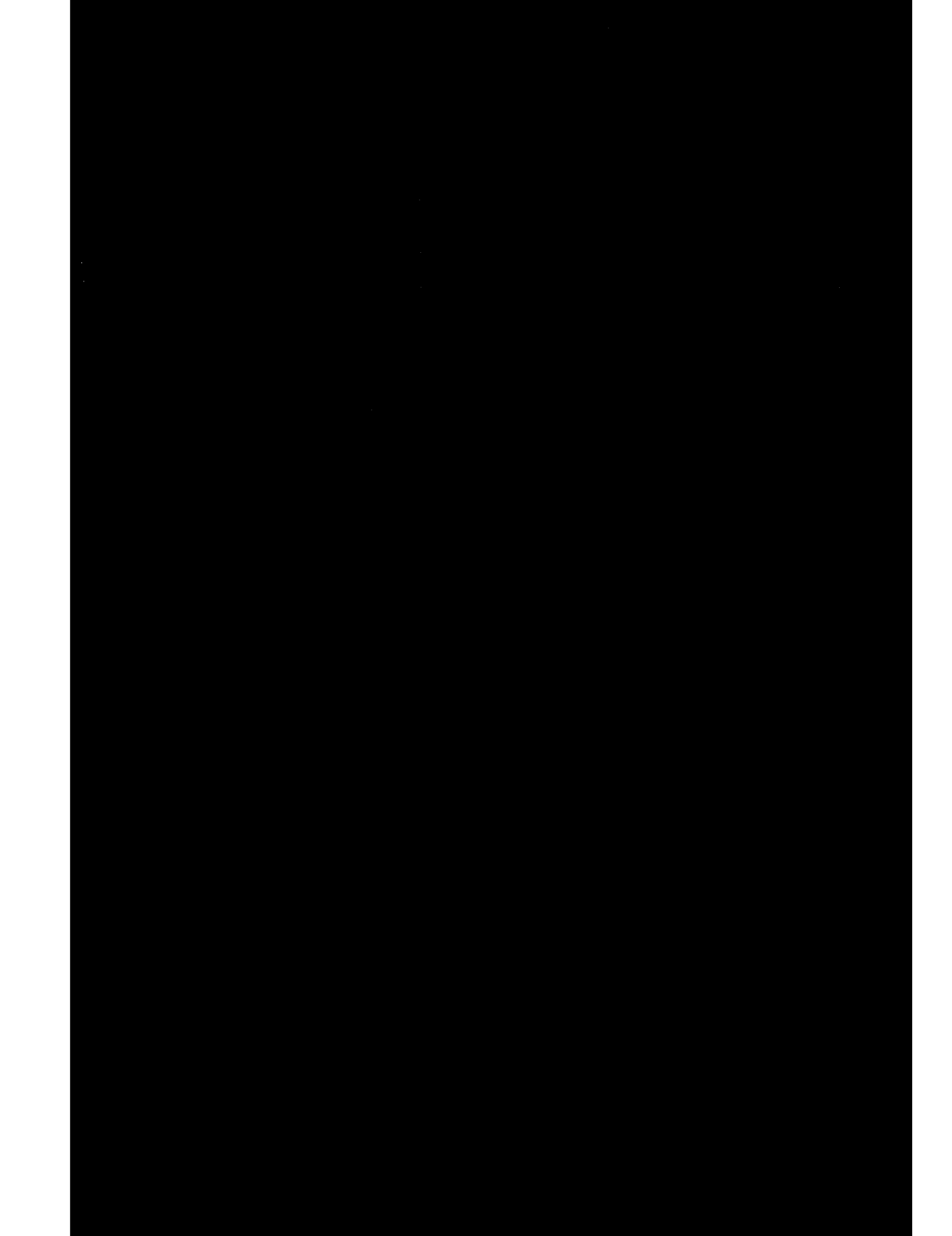

UNITED STATES PATENT AND TRADEMARK OFFICE
CERTIFICATE OF CORRECTION

PATENT NO. : 4,201,284
DATED : May 6, 1980
INVENTOR(S) : John H. Brems

It is certified that error appears in the above-identified patent and that said Letters Patent are hereby corrected as shown below:

Claim 5 (Col. 21, Line 46) - "X" should be "Y".

*Signed and Sealed this*

*Twelfth* Day of *August 1980*

[SEAL]

*Attest:*

SIDNEY A. DIAMOND

*Attesting Officer*   *Commissioner of Patents and Trademarks*